Feb. 4, 1930.   J. D. MAIER   1,746,086

REAMER FOR SMOKER'S PIPES

Filed Feb. 17, 1928

John D. Maier
INVENTOR

BY *Victor J. Evans*
ATTORNEY

WITNESS:

Patented Feb. 4, 1930

1,746,086

UNITED STATES PATENT OFFICE

JOHN D. MAIER, OF CHARLESTOWN, MARYLAND

REAMER FOR SMOKERS' PIPES

Application filed February 17, 1928. Serial No. 255,005.

This invention relates to a reamer for pipes, the general object of the invention being to provide a reamer, some of the blades of which are collapsible so that the device will be flat when said blades are folded against other blades, thus enabling the device to be placed in the pocket of the user when not in use, with means whereby the foldable blades will automatically assume a position at right-angles to the other blades when the device is placed in the bowl of a pipe and turned.

Another object of the invention is to make the device of tapered shape with the blades having curved edges so that the device will fit various sizes of pipes.

A still further object of the invention is to provide the device with pivoted members which can be swung outwardly and used to remove foreign matter from the mouth pieces of pipes and from the bowls of the pipes.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
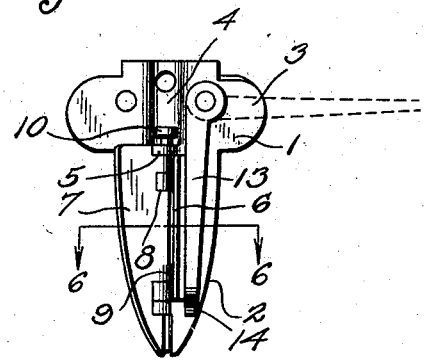
Figure 1 is an elevation of the device, with the wings folded.
Figure 2:
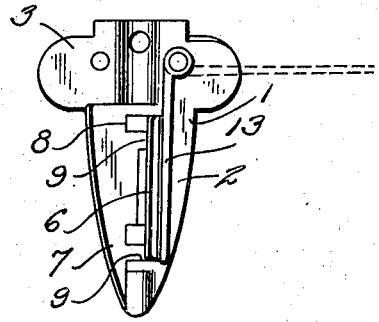
Figure 2 is a similar view of the opposite side of the device.

In these drawings, the numeral 1 indicates the body of the device which is formed with a tapered lower part having its edges slightly curved to form the stationary blades 2, the edges of which are beveled and the upper part is enlarged to form a head or handle 3, this handle having the projecting wings for forming a hand grip so that the device can be easily turned by the thumb and finger of one hand.

The body is provided with a centrally arranged longitudinally extending groove 4 and the grooved part is cut transversely to form the straps 5, these straps being bent outwardly in an opposite direction from the grooved portion so that they will form, with parts of the grooved portion, hinge barrels. The bottom of the groove between the straps is cut longitudinally and the edges of the metal adjacent the cut are bent in opposite directions to form the flanges 6. The foldable wings are shown at 7, these wings also having curved cutting edges and their inner edges are cut to form the recesses 8 and the inner edge of each foldable blade is formed with a pair of tongues which are bent over to form the hinge barrels 9. The foldable blades are placed one on each side of the body, with the hinge barrels of one blade engaging the recesses of the other blade and said barrels enter the opening left by the flanges 6. These barrels are in alignment with the barrels formed on the body so that a hinge pin 10 can be passed through the barrels to hingedly connect the foldable blades with the body, as shown in the drawings.

Figure 3:
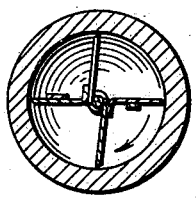
Figure 3 is a sectional view through the bowl of a pipe, showing the invention in use.
Figure 5:
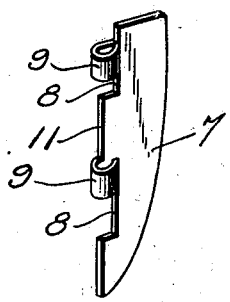
Figure 5 is a view of one of the foldable blades.

Thus it will be seen that the blades 7 can be folded against the stationary blades of the body so that the device will have a flat form and thus can be readily placed in the pocket of the user and this will also enable the devices to be packed in small boxes as they will occupy but little space when so folded. When the device is placed in the bowl of a pipe, as shown in Figure 3, and given a slight turn in a clockwise direction, the friction exerted on the foldable blades by the walls of the pipe will cause said blades to swing outwardly at rightangles to the body, as shown in Figure 3, so that all four blades will engage the walls of the bowl and thus scrape the same. When the foldable blades are in this position, they will bear against the flanges 6 and the parts 11 at the inner edges of the foldable blades will bear against the pin 10 so that said blades are firmly held in operative position. The flanges 6 also act to strengthen the stationary blades.

Figure 4:
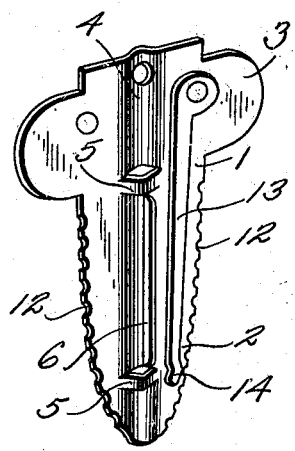
Figure 4 is a view of the body of the device, with the wings removed and showing the cutting edges of the stationary blades provided with indentations.
Figure 6:
Figure 6 is a section on line 6—6 of Figure 1.

Figure 4 shows the blades formed with indentations 12 in their cutting edges, the indentations of one blade being in alignment with those on the other blades so as to prevent an auger effect taking place when the device is rotated in the bowl of a pipe, which would occur if the indentations were offset as this offset arrangement would form spirals so that the device would act as an auger or screw and work itself into the bowl so that there would be danger of splitting the bowl.

Figure 7:
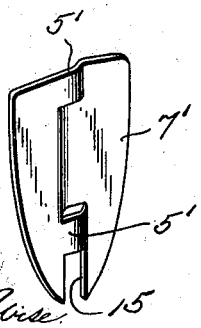
Figure 7 is a view of a modification, showing the foldable blades formed integral.

Figure 7 shows the blades 7' formed integral, the blades being connected together by the straps 5' which form the hinge barrels. A slot 15 is formed between the lower ends of the blades so that one of them may be passed through the opening in the body in assembling the device. The blades are offset as shown.

I also pivot a pair of arms 13 to the head part of the body, one arm being on one side and the other on the other side, with one arm of greater width than the other, with the wide arm having a small hook 14 at its outer end. These arms are used to remove foreign matter from the mouth piece of a pipe and to remove material from the bottom of the bowl and for other purposes. When these arms are not in use, they are folded inwardly over the stationary blades and they are frictionally held in this position.

From the foregoing it will be seen that I have provided a simple device for reaming out pipe bowls, the device being so formed that it will fit various sizes of bowls and when not in use, the device will be flat so that it can be carried in the pocket. By placing the device in a pipe bowl and turning it in a clockwise direction, the foldable blades will move outwardly to a position at rightangles to the body and thus provide a four-bladed reamer.

The head or handle part 4 also forms a reamer for the top of the bowl. In this connection, the device is reversed and the top part of the head is placed in the pipe and acts as a guide while the upper edges of the wings act to ream the top of the bowl.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. A pipe reamer of the class described comprising a flat body having a downwardly tapering lower part providing a pair of cutting edges and said body having a centrally arranged longitudinal groove therein with portions of the grooved part slotted, a hinge pin in the grooved part and a pair of foldable blades hingedly connected with the pin, said blades automatically moving outwardly into operative position when the device is placed in a pipe bowl and turned, and stop means for preventing the foldable blades from moving beyond their position at right angles to the body.

2. A pipe reamer of the class described comprising a flat body having a downwardly tapering lower part providing a pair of cutting edges, the central portion of the body having a longitudinally extending slot therein, a hinge pin connected with the body and passing lengthwise along the slot, a member having a portion passing through the slot with its central portion hingedly connected with the pin, the side edges of this member tapering downwardly to provide a pair of cutting edges, said member automatically moving outwardly to a position at right angles to the body when the device is placed in a pipe bowl and turned, and stop means for preventing the member from moving beyond a position at right angles to the body.

3. A pipe reamer of the class described comprising a flat body having a downwardly tapering lower part providing a pair of cutting edges, the central portion of the body having a longitudinally extending slot therein, a hinge pin connected with the body and passing lengthwise along the slot, a member having a portion passing through the slot with its central portion hingedly connected with the pin, the side edges of this member tapering downwardly to provide a pair of cutting edges, said member automatically moving outwardly to a position at right angles to the body when the device is placed in a pipe bowl and turned, and stop means for preventing the member from moving beyond a position at right angles to the body, such means comprising oppositely extending flanges on the body formed by bending the metal left by the slot outwardly from the body.

In testimony whereof I affix my signature.

JOHN D. MAIER.